US012449748B2

(12) United States Patent
Sueishi

(10) Patent No.: US 12,449,748 B2
(45) Date of Patent: Oct. 21, 2025

(54) IMAGE FORMING APPARATUS

(71) Applicant: KYOCERA Document Solutions Inc., Osaka (JP)

(72) Inventor: Naoki Sueishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/928,554

(22) Filed: Oct. 28, 2024

(65) Prior Publication Data

US 2025/0138456 A1 May 1, 2025

(30) Foreign Application Priority Data

Oct. 31, 2023 (JP) ................................ 2023-186071

(51) Int. Cl.
*G03G 15/20* (2006.01)
*G03G 15/00* (2006.01)

(52) U.S. Cl.
CPC ..... *G03G 15/2039* (2013.01); *G03G 15/2057* (2013.01); *G03G 15/2064* (2013.01); *G03G 15/80* (2013.01)

(58) Field of Classification Search
USPC ..................................................... 399/67, 69
See application file for complete search history.

(56) References Cited

U.S. PATENT DOCUMENTS

2017/0364001 A1 12/2017 Takagi et al.
2020/0249606 A1 8/2020 Takagi et al.
2020/0379384 A1 * 12/2020 Samei ............... G03G 15/2053

FOREIGN PATENT DOCUMENTS

JP 2004126103 A * 4/2004 ......... G03G 15/2039
JP 2017228525 A 12/2017

OTHER PUBLICATIONS

Computer translation for J:P2004-126103A to Saito Toru (Year: 2004).*

* cited by examiner

*Primary Examiner* — Quana Grainger
(74) *Attorney, Agent, or Firm* — Alleman Hall & Tuttle LLP

(57) ABSTRACT

The fixing device includes a heater, a holding member, a fixing member, a pressure roller, a drive mechanism, and a resistance measuring circuit. The holding member includes a metal portion and holds the heater. The pressure roller is rotatably supported, and applies pressure to a toner image on a sheet by sandwiching the fixing member and the sheet between the pressure roller and the heater. The resistance measuring circuit measures electrical resistance of the metal portion of the holding member. The control device controls whether to allow or prohibit a supply of power to the heater in accordance with a rotation state of the pressure roller and a measured resistance value of the resistance measuring circuit.

3 Claims, 3 Drawing Sheets

IMAGE FORMING APPARATUS

INCORPORATION BY REFERENCE

This application is based upon and claims the benefit of priority from the corresponding Japanese Patent Application No. 2023-186071 filed on Oct. 31, 2023, the entire contents of which are incorporated herein by reference.

The present disclosure relates to an image forming apparatus including a fixing device.

BACKGROUND

An electrophotographic image forming apparatus includes a transfer device and a fixing device. The transfer device transfers a toner image onto a sheet. The fixing device applies heat and pressure to the toner image on the sheet to fix the toner image to the sheet.

The fixing device may include a planar heater having a substrate and a plurality of resistors formed on the substrate.

SUMMARY

An image forming apparatus according to one aspect of the present disclosure includes a transfer device, a fixing device, and a control device. The transfer device transfers a toner image onto a sheet. The fixing device applies heat and pressure to the toner image on the sheet. The control device controls the fixing device. The fixing device includes a heater, a holding member, a fixing member, a pressure roller, a drive mechanism, and a resistance measuring circuit. The holding member includes a metal portion and holds the heater. The fixing member is a flexible cylindrical fixing member having an inner peripheral surface in contact with the heater. The pressure roller is rotatably supported, and applies pressure to the toner image on the sheet by sandwiching the fixing member and the sheet between the pressure roller and the heater. The drive mechanism rotates the pressure roller. The resistance measuring circuit measures electrical resistance of the metal portion of the holding member. The control device controls whether to allow or prohibit a supply of power to the heater in accordance with a rotation state of the pressure roller and a measured resistance value of the resistance measuring circuit.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment according to the present disclosure will be described with reference to the drawings. Note that the following embodiment is merely an example of a technique according to the present disclosure, and does not limit the technical scope of the technique according to the present disclosure.

[Configuration of Image Forming Apparatus 10]

Figure 1:
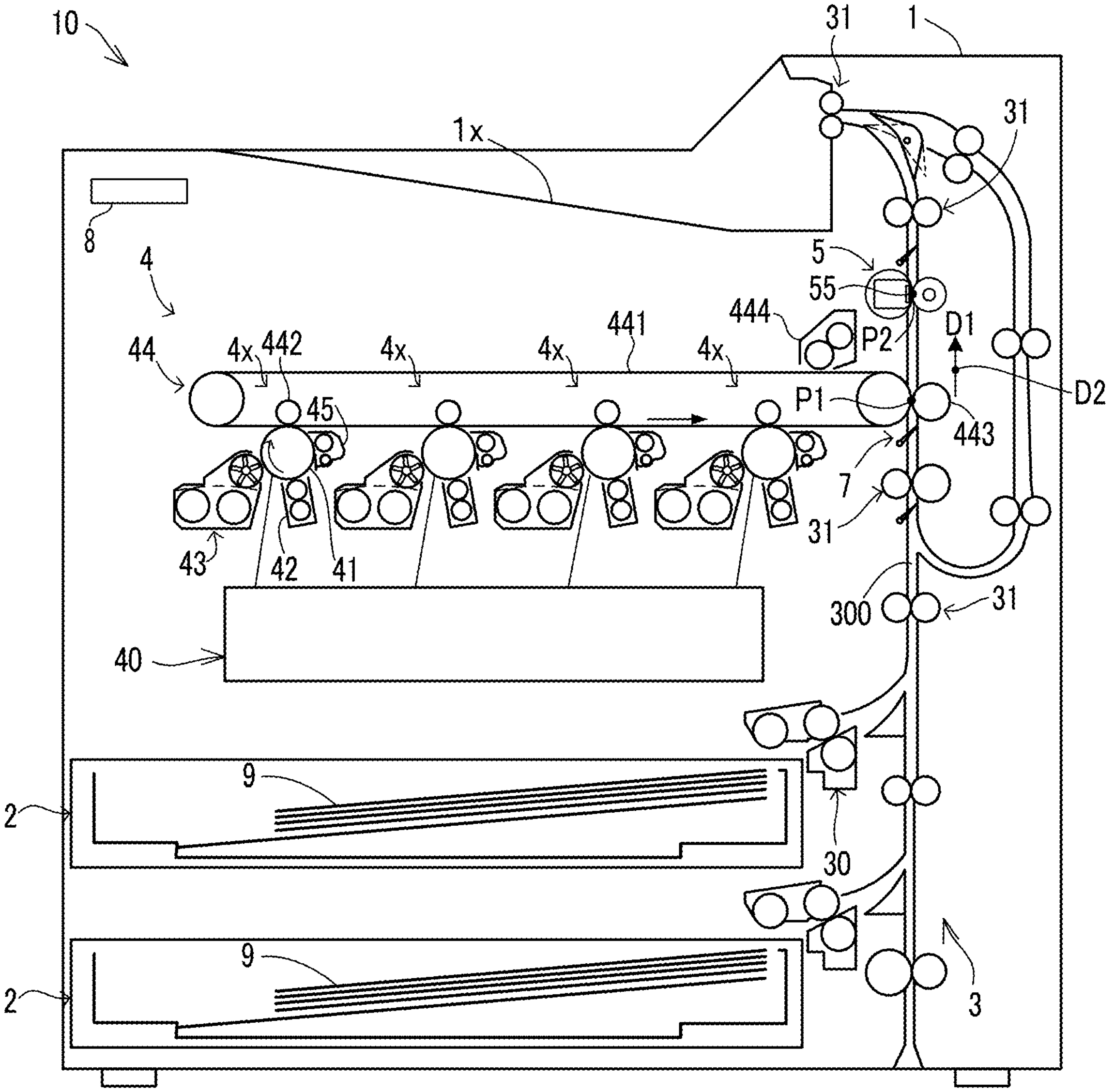
FIG. 1 is a configuration diagram of an image forming apparatus according to an embodiment.

As shown in FIG. 1, an image forming apparatus 10 includes a main portion 1, a sheet conveying device 3, a printing device 4, and a control device 8.

The printing device 4 executes a printing process for forming an image on a sheet 9. The printing device 4 executes the printing process by an electrophotographic method. The sheet 9 is an image forming medium such as paper or a sheet-like resin member.

The sheet conveying device 3 includes a sheet feeding device 30 and a plurality of sets of conveying roller pairs 31. The sheet feeding device 30 feeds out the sheet 9 stored in the sheet storing portion 2 to a conveying path 300 in the main portion 1. The conveying path 300 forms a passage through which the sheet 9 is conveyed.

The plurality of sets of conveying roller pairs 31 are rotationally driven by a motor (not shown). The plurality of sets of conveying roller pairs 31 rotate to convey the sheet 9 along the conveying path 300, and then discharge the sheet 9 into a discharge tray 1*x*.

The sheet 9 passes through a transfer position P1 and a fixing position P2 on the conveying path 300, and is discharged into the discharge tray 1*x*.

In the following description, a sheet conveying direction along the conveying path 300 is referred to as a conveying direction D01. The fixing position P2 is a position downstream of the transfer position P1 in the conveying direction D01.

In addition, a direction crossing the conveying direction D01 in the conveying path 300 is referred to as a main direction D1. In the present embodiment, the main direction D1 is a direction perpendicular to the conveying direction D01. The main direction D1 is the main scanning direction in the printing process.

The printing device 4 forms a toner image on a sheet 9 conveyed along the conveying path 300. The toner image is a developer image using toner as a developer. The toner is an example of a granular developer.

The printing device 4 includes one or more image forming portions 4*x*, a laser scanning unit 40, a transfer device 44, and a fixing device 5. The image forming portion 4*x* includes a drum-shaped photoconductor 41, a charging device 42, a developing device 43, a drum cleaning device 45, and the like.

The image forming apparatus 10 shown in FIG. 1 is a tandem type color image forming apparatus. Therefore, the printing device 4 has four image forming portions 4*x* corresponding to toners of the four colors, yellow, cyan, magenta and black.

In the image forming portion 4*x*, the photoconductor 41 rotates, and the charging device 42 charges the surface of the photoconductor 41. Furthermore, the laser scanning unit 40 writes an electrostatic latent image on the surface of the photoconductor 41 by scanning with a laser beam.

Moreover, the developing device 43, by supplying the toner to the surface of the photoconductor 41, develops the electrostatic latent image into the toner image. The photoconductor 41 is an example of an image-carrying member that rotates while carrying the toner image.

The transfer device 44 transfers the toner image onto the sheet 9 at a transfer position P1 on the conveying path 300. The transfer device 44 includes an intermediate transfer belt 441, four primary transfer devices 442 corresponding to the four image forming portions 4_x_, a secondary transfer device 443, and a belt cleaning device 444.

In the transfer device 44, the primary transfer device 442 transfers the toner image on the surface of the photoconductor 41 onto the surface of the intermediate transfer belt 441. Thus, a color toner image is formed on the surface of the intermediate transfer belt 441.

The secondary transfer device 443 transfers the toner image formed on the intermediate transfer belt 441 onto the sheet 9 on the conveying path 300.

Note that in a case in which the image forming apparatus 10 is a monochrome image forming apparatus, the secondary transfer device 443 transfers the toner image on the photoconductor 41 onto the sheet 9 on the conveying path 300.

The drum cleaning device 45 removes waste toner remaining on the surface of the photoconductor 41. The belt cleaning device 444 removes the waste toner remaining on the intermediate transfer belt 441.

[Fixing Device 5]

The fixing device 5 heats and presses the toner image on the sheet 9 while conveying the sheet 9 at a fixing position P2 on the conveying path 300. As a result, the fixing device 5 fixes the toner image on the sheet 9 to the sheet 9.

Figure 2:
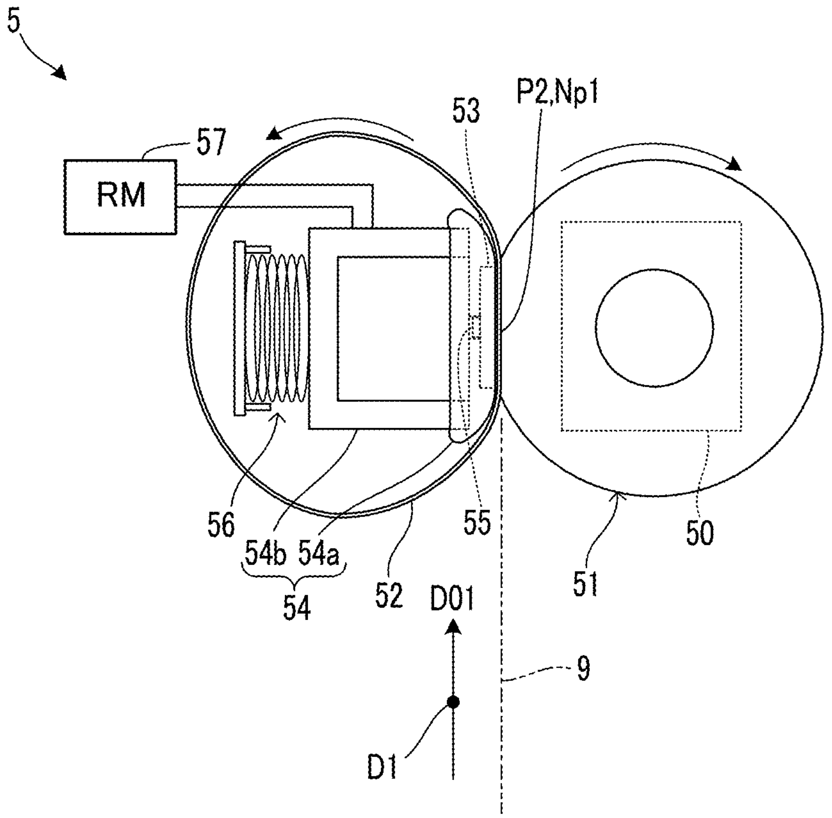
FIG. 2 is a configuration diagram of a fixing device in an image forming apparatus according to the embodiment.

As shown in FIG. 2, the fixing device 5 includes a pressure roller 51, a fixing member 52, a heater 53, a holding member 54, one or more temperature sensors 55, a biasing mechanism 56, and a drive mechanism 50.

The pressure roller 51, the fixing member 52, the holding member 54, and the heater 53 are each arranged along the main direction D1 at the fixing position P2. The pressure roller 51, the fixing member 52, the heater 53 and the holding member 54 are formed to extend in the main direction D1.

The fixing member 52 is a flexible cylindrical member. For example, the fixing member 52 is a cylindrical film member. The fixing member 52 is rotatably supported by a holding member 54. The inner peripheral surface of the fixing member 52 comes in contact with the heater 53.

The pressure roller 51 is rotatably supported. The pressure roller 51, by coming into pressure contact with the fixing member 52, forms a nip Np1 between the pressure roller 51 and the fixing member 52 (see FIG. 2).

When the sheet 9 passes through the fixing position P2, the pressure roller 51 pressurizes the toner image on the sheet 9 by sandwiching the fixing member 52 and the sheet 9 between the pressure roller 51 and the heater 53. The heater 53 heats the toner image on the sheet 9 via the fixing member 52.

The drive mechanism 50 rotates the pressure roller 51. For example, the drive mechanism 50 includes a motor and a gear mechanism.

As the pressure roller 51 rotates, the fixing member 52 rotates in conjunction with the pressure roller 51. As the fixing member 52 rotates, the inner circumferential surface of the fixing member 52 slides on the surface of the heater 53. An inner peripheral surface of the fixing member 52 is coated with a lubricant.

The holding member 54 holds the heater 53 and rotatably supports the fixing member 52. The heater 53 is held by the holding member 54 in a state aligned with the main direction D1. The holding member 54 has a synthetic resin portion 54_a_ and a metal portion 54_b_.

The synthetic resin portion 54_a_ holds the heater 53. The synthetic resin portion 54_a_ is arranged facing the pressure roller 51 with the fixing member 52 interposed therebetween. The metal portion 54_b_ holds the synthetic resin portion 54_a_. For example, the metal portion 54_b_ is made of a metal such as iron or stainless steel.

The biasing mechanism 56 elastically biases the metal portion 54_b_ of the holding member 54 toward the pressure roller 51. That is, the biasing mechanism 56 elastically biases the fixing member 52 toward the pressure roller 51 via the holding member 54.

The temperature sensor 55 detects the temperature of the heater 53. The temperature detected by the temperature sensor 55 is used to control the fixing temperature. The fixing temperature control is a feedback control in which the power supplied to the heater 53 is controlled by comparing the temperature detected by the temperature sensor 55 with a preset target temperature.

[Control Device 8]

The control device 8 executes various types of data processing, and controls devices such as the sheet conveying device 3 and the printing device 4. The objects to be controlled by the control device 8 include conveying of the sheet 9 by the sheet conveying device 3 and power supply to the heater 53 of the fixing device 5.

Figure 3:
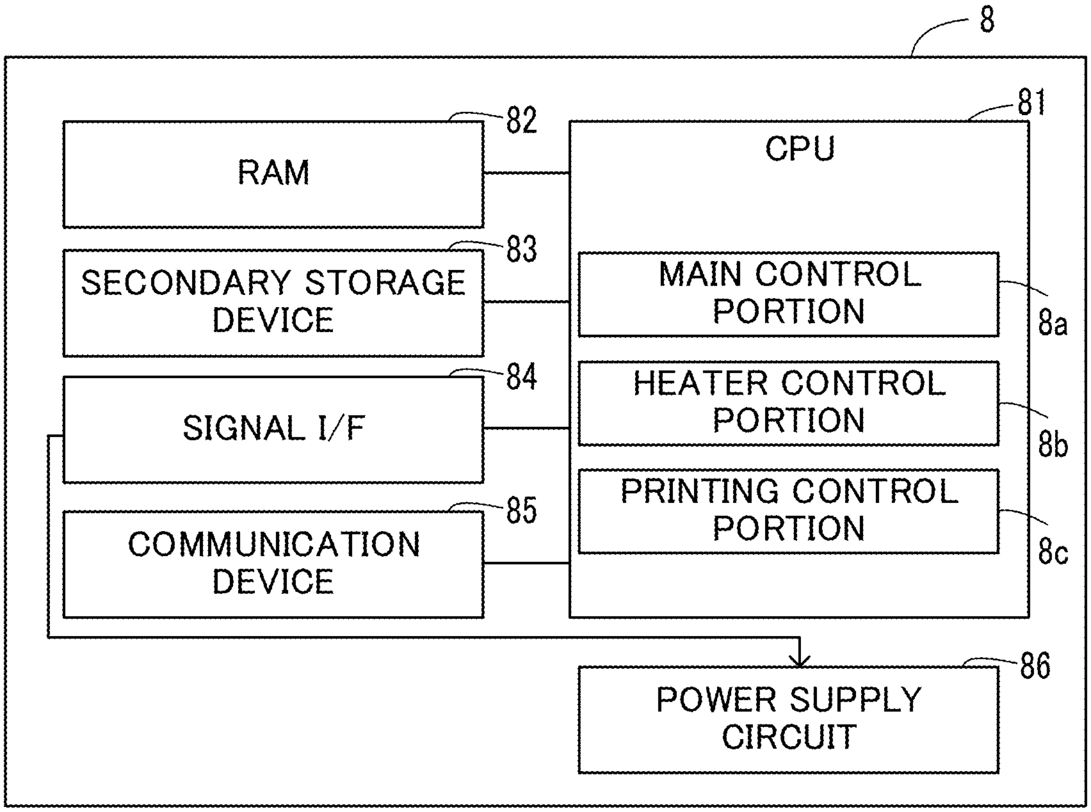
FIG. 3 is a block diagram showing a configuration of a control device in an image forming apparatus according to an embodiment.

As shown in FIG. 3, the control device 8 includes a central processing unit (CPU) 81 and peripheral devices. The peripheral devices include a random access memory (RAM) 82, a secondary storage device 83, and a signal interface (I/F) 84 and the like.

Furthermore, the control device 8 includes a communication device 85 and a power supply circuit 86.

The CPU 81 is a processor that executes various types of data processing and control by executing computer programs.

The RAM 82 is a computer-readable volatile storage device. The RAM 82 temporarily stores the computer programs executed by the CPU 81 and data output and referenced by the CPU 81 in the course of executing various types of processes.

The CPU 81 includes a plurality of processing modules that are achieved by executing the computer programs. The plurality of processing modules include a main control portion 8_a_, a heater control portion 8_b_, and a printing control portion 8_c_.

The main control portion 8_a_ executes control such as start control for starting various types of processes in response to an operation on an operation device (not shown).

The heater control portion 8_b_ controls the amount of power supplied to the heater 53 by controlling the fixing temperature. The heater control portion 8_b_ adjusts the amount of power supplied to the heater 53 by controlling the power supply circuit 86.

The power supply circuit 86 supplies power to the heater 53 in accordance with a power supply command from the heater control portion 8_b_.

The printing control portion 8_c_ controls the sheet conveying device 3. Furthermore, the printing control portion 8_c_ causes the printing device 4 to execute the printing process in synchronization with the conveying of the sheet 9 by the sheet conveying device 3.

The control device 8 controls the power supply to the heater 53 and controls the sheet conveying device 3 through the actions of a heater control portion 8*b* and a printing control portion 8*c*, and further controls the image forming portion 4*x* and the transfer device 44.

The secondary storage device 83 is a computer-readable non-volatile storage device. For example, one or both of a flash memory and a hard disk drive may be employed as the secondary storage device 83.

The signal I/F 84 converts detection signals output by various types of sensors into digital data, and transmits the digital data to the CPU 81. Furthermore, the signal I/F 84 converts the control command output by the CPU 81 into a control signal, and transmits the control signal to the object to be controlled.

The communication device 85 executes communication with other devices such as a host device that transmits a printing job to the image forming apparatus 10. The CPU 81 communicates with the other devices through the communication device 85.

Figure 4:
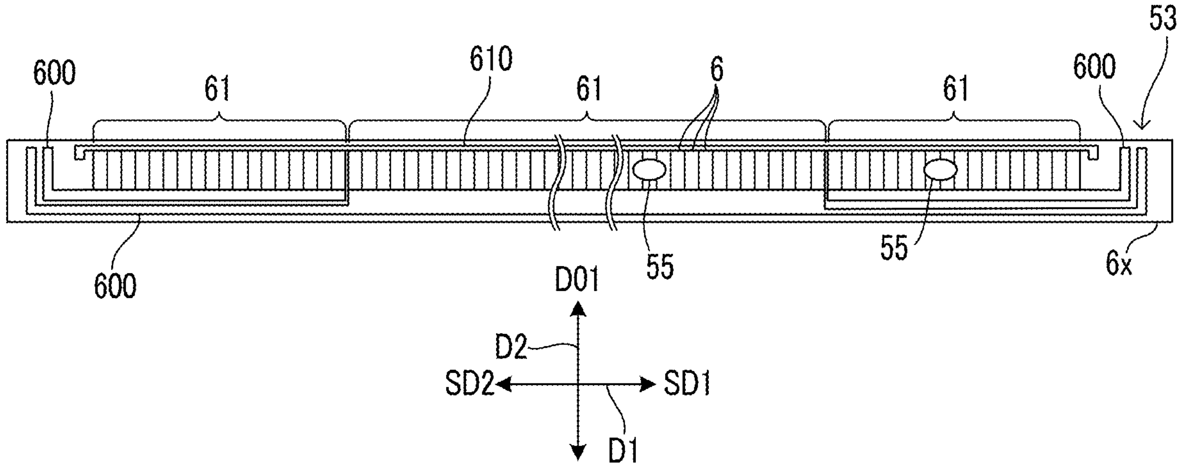
FIG. 4 is a plan view of a heater in a fixing device of an image forming apparatus according to an embodiment.

In the present embodiment, the heater 53 is a planar heater having a plurality of resistors 6 (see FIG. 4).

The heater 53 includes a substrate 6*x*, a plurality of resistors 6, one or more power supply electrodes 600, and a ground electrode 610 (see FIG. 4). The heater 53 further includes a protective layer 62 (see FIG. 5).

The substrate 6*x* is a non-conductive member. For example, the substrate 6*x* is a film. A plurality of resistors 6 are formed on the surface of a substrate 6*x*. Each resistor 6 is a heating element that generates heat when power is supplied thereto.

In the present embodiment, the plurality of resistors 6 are divided into a plurality of resistor blocks 61. Each of the plurality of heater blocks 60 includes a plurality of resistors 6 arranged in the main direction D1.

The heater 53 includes a plurality of power supply electrodes 600 corresponding to a plurality of resistor blocks 61 (see FIG. 4). Furthermore, the heater 53 includes two temperature sensors 55 for detecting the temperatures of two of the plurality of resistor blocks 61 (see FIG. 4).

In each drawing, a sub-direction D2 is a direction along the conveying direction D01. The sub-direction D2 is a direction crossing the main direction D1. The main direction D1 is the longitudinal direction of the heater 53. The sub-direction D2 is the widthwise direction of the heater 53.

The plurality of power supply electrodes 600 are electrically connected to first ends of the plurality of heater blocks 60 in the secondary direction D2. The ground electrode 610 is connected to second ends of the plurality of heater blocks 60 in the secondary direction D2. That is, the plurality of power supply electrodes 600 and the ground electrode 610 are electrically connected to the plurality of resistors 6.

Figure 5:
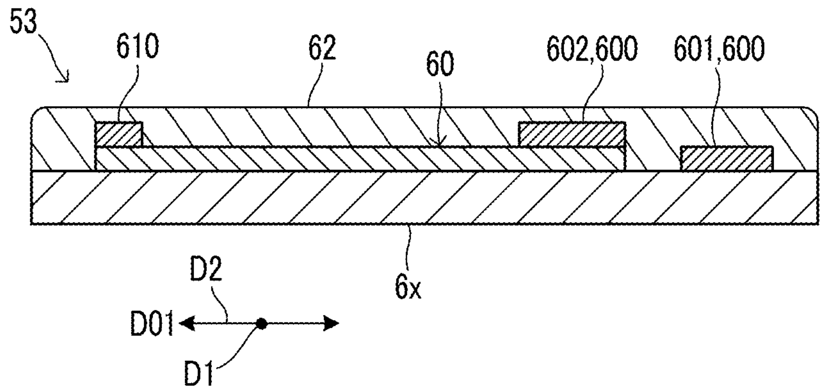
FIG. 5 is a cross-sectional view of a heater in a fixing device of an image forming apparatus according to an embodiment.

The protective layer 62 is a non-conductive member that covers the plurality of resistors 6 and the plurality of electrodes 600 and 610 (see FIG. 5).

The power supply circuit 86 is capable of supplying power individually to each heater block 60 via part of or all of the plurality of power supply electrodes 600 and the ground electrode 610.

The heater control portion 8*b* selects a target heater block from the plurality of heater blocks 60 in accordance with the size of the sheet 9 to be conveyed, and supplies power to the target heater block via the power supply circuit 86.

The plurality of resistors 6 in the heater 53 are arranged at slight intervals on the substrate 6*x*, and are thus electrically insulated. However, dielectric breakdown may occur in part of the resistors 6.

When the supply of power to the heater 53 continues when the dielectric breakdown occurs in a part of the heater 53, the entire heater 53 may become abnormally hot, and there is a possibility that a dangerous situation may occur.

Therefore, when localized dielectric breakdown occurs in the heater 53, it is desirable to be able to detect the occurrence of the dielectric breakdown as soon as possible and to stop the power supply to the heater 53.

The image forming apparatus 10 includes a configuration for quickly stopping the power supply to the heater 53 when the dielectric breakdown occurs in a part of the heater 53 in the fixing device 5. The configuration will be described below.

In the present embodiment, the fixing device 5 further includes a resistance measuring circuit 57 that measures electrical resistance of the metal portion 54*b* of the holding member 54 (see FIG. 2).

For example, the resistance measuring circuit 57 includes one or more resistive elements that form a voltage divider circuit together with the metal portion 54*b*, a power source that supplies a minute current to the voltage divider circuit, and a voltage detection circuit that detects the voltage of the voltage divider circuit. In this case, the detected voltage of the voltage detection circuit represents the electrical resistance of the metal portion 54*b*.

The substrate 6*x* and the protective layer 62 have a relatively low heat transfer rate and low thermal conductivity. Therefore, in a case in which a part of the heater 53 becomes locally hot, the temperature may not be promptly reflected by the temperature sensor 55.

On the other hand, the metal portion 54*b* of the holding member 54 has a higher heat transfer rate and a higher thermal conductivity than the substrate 6*x* and the protective layer 62. Therefore, when a part of the heater 53 becomes hot, the temperature of the metal portion 54*b* increases quickly.

Furthermore, as the temperature of the metal portion 54*b* increases, electrical resistance of the metal portion 54*b* increases. That is, the electrical resistance of the metal portion 54*b* represents the temperature of the metal portion 54*b*.

In the following description, the resistance value of the metal portion 54*b* measured by the resistance measuring circuit 57 is referred to as a measured resistance value. The heater control portion 8*b* of the control device 8 controls whether to allow or prohibit the supply of power to the heater 53 in accordance with the rotation state of the pressure roller 51 and the resistance measurement value.

For example, the heater control portion 8*b* determines the rotation state of the pressure roller 51 according to the control state of the drive mechanism 50 by the print control portion 8*c*.

In the present embodiment, the heater control portion 8*b* controls whether to allow or prohibit the supply of power to the heater 53 in accordance with the magnitude relationship between the measured resistance value and a first reference value while the pressure roller 51 is stopped.

More specifically, the heater control portion 8*b* allows power supply to the heater 53 in a case in which the measured resistance value is lower than the first reference value while the pressure roller 51 is stopped. On the other hand, the heater control portion 8*b* prohibits the supply of power to the heater 53 in a case in which the measured resistance value exceeds the first reference value while the pressure roller 51 is rotating.

In addition, the heater control portion 8*b* controls whether to allow or prohibit the supply of power to the heater 53 in accordance with the magnitude relationship between the measured resistance value and a second reference value while the pressure roller 51 is rotating.

The amount of heat transferred from the heater 53 to the pressure roller 51 via the fixing member 52 is greater when the pressure roller 51 is rotating than when the pressure roller 51 is stopped.

Therefore, the temperature of the metal portion 54*b* when part of the heater 53 has risen to a predetermined upper limit temperature is lower when the pressure roller 51 is rotating than when the pressure roller 51 is stopped.

The first reference value corresponds to the electrical resistance of the metal portion 54*b* when a part of the heater 53 rises to the upper limit temperature while the pressure roller 51 is stopped. On the other hand, the second reference value corresponds to the electrical resistance of the metal portion 54*b* when a part of the heater 53 rises to the upper limit temperature while the pressure roller 51 is rotating.

Thus, the second reference value represents a greater resistance value than the first reference value. The first reference value and the second reference value are experimentally determined in advance.

Prohibiting the supply of power to the heater 53 includes stopping the supply of power to the heater 53 when power is being supplied to the heater 53, and not starting the supply of power to the heater 53.

Allowing the supply of power to the heater 53 includes allowing the supply of power to the heater 53 to continue when power is being supplied to the heater 53, and allowing the supply of power to the heater 53 to begin.

By employing the image forming apparatus 10, the supply of power to the heater 53 can be stopped immediately when the dielectric breakdown occurs in a part of the heater 53 in the fixing device 5. As a result, a dangerous situation is avoided.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
- a transfer device configured to transfer a toner image onto a sheet;
- a fixing device configured to apply heat and pressure to the toner image on the sheet; and
- a control device configured to control the fixing device; wherein the fixing device comprises:
- a heater;
- a holding member including a metal portion and configured to hold the heater;
- a flexible cylindrical fixing member having an inner peripheral surface in contact with the heater;
- a pressure roller that is rotatably supported and configured to apply pressure to the toner image on the sheet by sandwiching the fixing member and the sheet between the pressure roller and the heater;
- a drive mechanism configured to rotate the pressure roller; and
- a resistance measuring circuit configured to measure electrical resistance of the metal portion of the holding member; and the control device controls whether to allow or prohibit a supply of power to the heater in accordance with a rotation state of the pressure roller and a measured resistance value of the resistance measuring circuit.

2. The image forming apparatus according to claim 1, wherein the control device controls whether to allow or prohibit the supply of to the heater when the pressure roller is stopped in accordance with a magnitude relationship between the measured resistance value of the resistance measuring circuit and a first reference value, and controls whether to allow or prohibit the supply of power to the heater when the pressure roller is rotating in accordance with a magnitude relationship between the measured resistance value of the resistance measuring circuit and a second reference value representing a resistance value greater than the first reference value.

3. The image forming apparatus according to claim 1, wherein the heater includes a non-conductive substrate, a plurality of resistors formed on a surface of the substrate, a plurality of electrodes electrically connected to the plurality of resistors, and a non-conductive protective layer covering the plurality of resistors and the plurality of electrodes; and the holding member includes a synthetic resin portion configured to hold the substrate, and the metal portion configured to hold the synthetic resin portion.

* * * * *